United States Patent
Jakob et al.

(10) Patent No.: US 8,747,010 B2
(45) Date of Patent: Jun. 10, 2014

(54) CONTROL DEVICE WITH BLOCKABLE ATTACHMENT PLACES

(75) Inventors: Gert Jakob, Stuttgart (DE); Bernd Eckert, El Paso, TX (US)

(73) Assignee: Robert Bosch GmbH, Stuttgart (DE)

( * ) Notice: Subject to any disclaimer, the term of this patent is extended or adjusted under 35 U.S.C. 154(b) by 1869 days.

(21) Appl. No.: 10/881,914

(22) Filed: Jun. 30, 2004

(65) Prior Publication Data

US 2005/0001119 A1  Jan. 6, 2005

(30) Foreign Application Priority Data

Jul. 2, 2003 (DE) .................................. 103 29 741

(51) Int. Cl.
 *B25G 3/00* (2006.01)
 *F16D 1/09* (2006.01)
 *F16D 1/00* (2006.01)

(52) U.S. Cl.
 USPC ................... 403/13; 403/27; 403/4; 248/544; 248/558; 248/205.1; 248/911

(58) Field of Classification Search
 USPC ........... 248/544, 558, 205.1, 911; 403/13, 27, 403/4; 211/71.01, 194, 196, 205; 285/914, 285/913, 334.4
 See application file for complete search history.

(56) References Cited

U.S. PATENT DOCUMENTS

| | | | | |
|---|---|---|---|---|
| 670,120 A * | 3/1901 | Van Tuyl | ......................... | 30/144 |
| 2,164,846 A * | 7/1939 | Thompson | ................ | 248/228.1 |
| 2,250,463 A * | 7/1941 | Boynton | ......................... | 403/13 |
| 2,285,803 A * | 6/1942 | Cammack | ...................... | 403/13 |
| 2,372,269 A * | 3/1945 | Golan | ........................... | 81/121.1 |
| 3,185,503 A * | 5/1965 | Angle | ............................ | 285/74 |
| 4,225,191 A * | 9/1980 | Knoski | ..................... | 301/35.627 |
| 4,561,795 A * | 12/1985 | Panuska | ............................ | 403/4 |
| 4,952,755 A * | 8/1990 | Engel et al. | ..................... | 174/67 |
| 5,107,404 A * | 4/1992 | Tam | ............................. | 361/818 |
| 5,147,979 A * | 9/1992 | Yang | ............................. | 174/482 |
| 5,166,862 A * | 11/1992 | Durivage et al. | ............. | 361/703 |
| 5,174,675 A * | 12/1992 | Martin | ............................. | 403/4 |
| 5,548,481 A * | 8/1996 | Salisbury et al. | ............. | 361/709 |
| 5,562,301 A * | 10/1996 | Lutz | ............................ | 280/728.2 |
| 5,920,934 A * | 7/1999 | Hannagan et al. | ................. | 5/713 |
| 6,083,057 A * | 7/2000 | Annecke et al. | .............. | 439/752 |
| 6,286,529 B1 * | 9/2001 | Olivera | .......................... | 135/82 |
| 6,523,861 B1 * | 2/2003 | Clancy et al. | .................... | 285/93 |
| 6,607,406 B2 * | 8/2003 | Banas et al. | .................. | 439/668 |
| 6,644,617 B2 * | 11/2003 | Pitlor | ............................ | 248/544 |

(Continued)

FOREIGN PATENT DOCUMENTS

| | | |
|---|---|---|
| DE | 43 00 342 | 7/1994 |
| EP | 0 790 149 | 8/1997 |
| EP | 1 296 545 | 3/2003 |
| JP | 60-107897 | 6/1985 |
| JP | 1417716 | 5/1989 |
| JP | 11-225416 | 8/1999 |

OTHER PUBLICATIONS

Ausloeseeinheit Rueckhalte System (ARS), Arbeitskreis ARS, Sep. 17, 1993.

*Primary Examiner* — Terrell McKinnon
*Assistant Examiner* — Michael McDuffie
(74) *Attorney, Agent, or Firm* — Michael J. Striker

(57) ABSTRACT

A control device has a plurality of possible attachment places for receiving attachment elements at least one of the attachment places being formed as a blocking attachment place which prevents receiving of an attachment element.

6 Claims, 2 Drawing Sheets

(56) References Cited

U.S. PATENT DOCUMENTS

| | | | |
|---|---|---|---|
| 6,663,494 B2 * | 12/2003 | Curi | 464/170 |
| 6,789,819 B1 * | 9/2004 | Husby | 280/735 |
| RE38,881 E * | 11/2005 | Chubb et al. | 248/231.9 |
| 7,041,901 B2 * | 5/2006 | Case | 174/50 |
| 7,201,585 B2 * | 4/2007 | Pirner et al. | 439/76.1 |
| 2002/0160645 A1 * | 10/2002 | Nagamine et al. | 439/352 |
| 2002/0197897 A1 * | 12/2002 | Osada | 439/188 |
| 2003/0067751 A1 * | 4/2003 | Skofljanec et al. | 361/720 |

* cited by examiner

CONTROL DEVICE WITH BLOCKABLE ATTACHMENT PLACES

CROSS-REFERENCE

The invention described and claimed hereinbelow is also described in DE 103 29741.3 filed Jul. 2, 2003. This German Patent Application, whose subject matter is incorporated here by reference, provides the basis for a claim of priority of invention under 35 U.S.C. 119 (a)-(d).

BACKGROUND OF THE INVENTION

The present invention relates to a control device with several possible attachment places for receiving of attachment means.

The customers catalog "Auslöseeinheit Rückhalte System" (ARS), Arbeitskreis ARS, Sep. 17, 1993 discloses a control device with attachment places. The sensor system of such a control device has the function of monitoring the travel-dynamic condition of a vehicle and adjust to the corresponding installation location with respect to the vehicle axes. A false installation position leads to faulty measurements and to a malfunction of the safety operation. In order to guarantee a correct installation position, the so-called customer catalog provides a control device with three asymmetrically arranged attachment places. An installation platform with three attachment pins which correspond to the attachment places is mounted as a counter piece to the control device in the motor space of a vehicle. Due to the asymmetrical arrangement of the attachment places and pins, an accurate installation position is guaranteed.

The installation location of the control device is typically dependent on a vehicle, so that the control devices are determined on the basis of the corresponding vehicle type. The installation of a control device which is wrong for the vehicle leads to error functions in a safety relevant region and must be avoided. Due to the asymmetrical arrangement of the attachment places in accordance with the customer catalog the installation of a control device on another vehicle type is not prevented.

SUMMARY OF THE INVENTION

Accordingly, it is an object of the present invention to provide a control device with blockable attachment places, which avoids the disadvantages of the prior art.

In keeping with these objects and with others which will become apparent hereinafter, one feature of the present invention resides, briefly stated, in a control device, comprising a plurality of possible mounting places for receiving mounting means, at least one of said mounting places being formed as a blocking mounting place which prevents receiving of a mounting means.

When the control device is designed in accordance with the present invention, it has the advantage that the control device has a plurality of possible attachment places and by blocking at least one attachment place it prevents the installation of the control device in a vehicle of a type which is wrong for it.

It is especially advantageous, in accordance with another embodiment of the present invention, when at least one blocking attachment place is formed without a recess. Therefore, it can be formed during the manufacture of housing of the control device in a vehicle-typical manner.

In accordance with a further preferable embodiment of the present invention, at least one possible attachment place is blocked with an introduced device. This makes possible an advantageous uniform manufacture of the housing of the control device. The vehicle-typical blocking of an attachment place is performed by insertion of a corresponding device in a later manufacturing step.

In accordance with a further embodiment of the present invention, the device for blocking a possible attachment place is formed as a clamp. In this way, an attachment place is efficiently blocked with simple means.

In accordance with a further preferable embodiment of the present invention, a control device is fixed over the position of at least one blocking attachment place. Thereby, a control device in an advantageous manner can be installed only in a predetermined installation location. In not predetermined installation locations, the installation is prevented via the blocking attachment place.

In accordance with a further embodiment of the present invention, the control device has four possible attachment places, wherein one of the attachment places is blocked. In this embodiment, in an advantageous manner the control device can be mounted in accordance with the customer catalog of the working circuit ARS, and simultaneously the recommendations of the working circle can be fulfilled.

In accordance with a further preferable embodiment of the present invention, the control device in an advantageous manner is formed as an airbag control device.

In accordance with a further preferable embodiment of the present invention, the possible attachment places are arranged in a rectangular grid 70 times 95 mm. Thereby in the advantageous manner the requirements for a release unit of restoring systems is fulfilled in accordance with the working circuit ARS.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
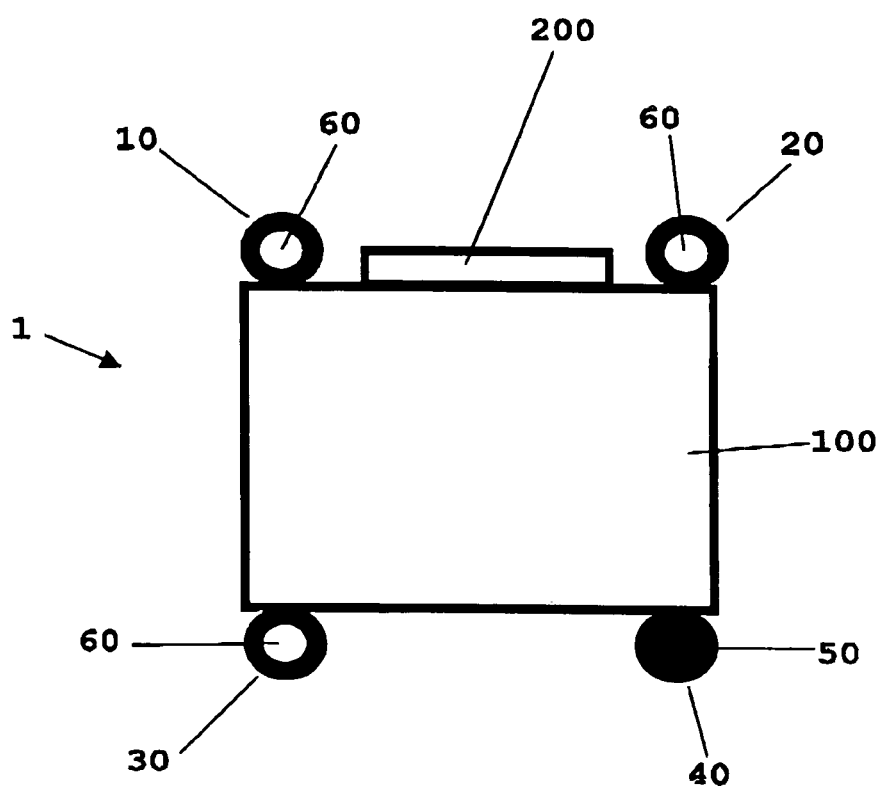
FIG. 1 is a view showing the inventive control device with a completely closed attachment place in accordance with the present invention.
Figure 2:
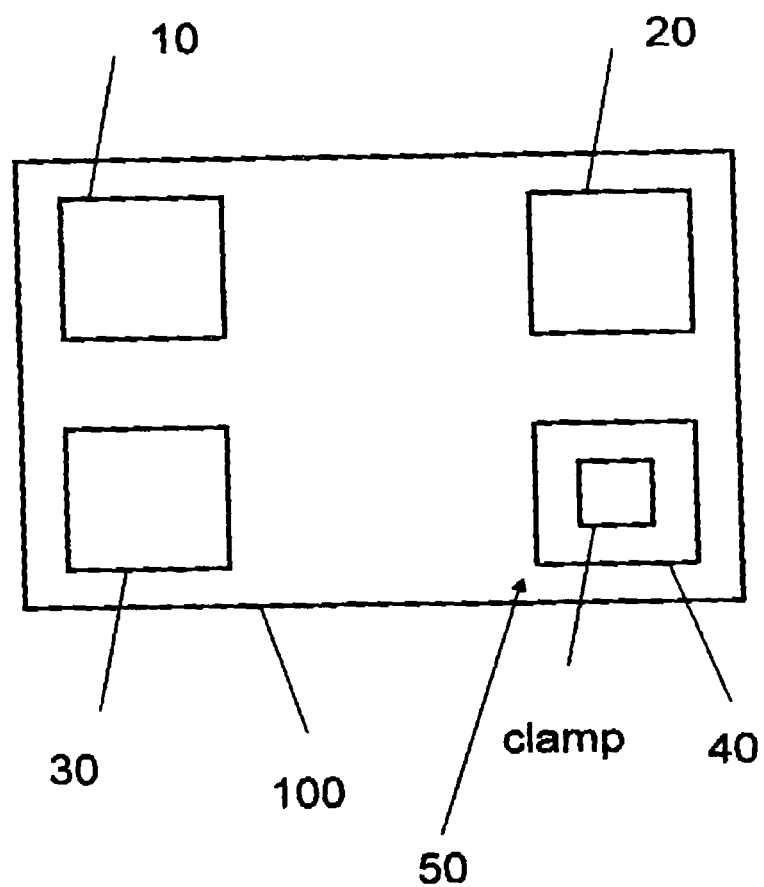
FIG. 2 is a viewing showing the inventive control device and further indicating a clamp.

An inventive control device is shown in FIG. 1 and identified as a whole with reference numeral 1. The control device has a housing 100. The housing is rectangular and has four possible attachment places each arranged on a respective longitudinal side of the housing in a corresponding corner region.

A plug 200 is arranged on one longitudinal side of the housing 100 between two attachment places 10 and 20. An attachment place 40 is provided on a longitudinal side of the housing 100, which is opposite to the plug 200. The attachment place 40 is formed as a blocking attachment place 50. The blocking attachment place 50 is closed and unsuitable for receiving an attachment means. The remaining three attachment places 10, 20, 30 have recesses for receiving an attachment means.

The arrangement of the possible attachment places is formed so that with a "key-lock" principle, an exchange during the mounting is excluded. Thereby similar devices can not be installed in an erroneous manner due to a different design of the possible attachment places.

In the exemplary embodiment shown in FIG. 1, four possible attachment places 10-40 are provided, wherein one attachment place 40 is closed as a blocking attachment place 50, and the remaining three attachment places 10, 20, 30 are provided with recesses 60 for receiving an attachment means. By different positioning of the blocking attachment places 50, four different embodiment forms can be determined.

Installation platforms are associated with corresponding embodiment forms of the control device and are provided with attachment means which correspond to the positions of the open attachment places 10, 20, 30. In the position of the blocking attachment place 50 no mounting means is provided. If the control device is installed in an installation platform which is not provided for it, the blocking attachment plate 50 interferes with an attachment means of the installation platform and prevents an unpermissible installation.

Typically threaded pins or rods can be provided as the attachment means on the installation platforms. Their positions are determined by the corresponding embodiment forms of the control device.

In the embodiment shown in FIG. 1, a rotation-symmetrical variant is provided for each selected position. The rotation-symmetrical variant can be installed by turning about 180° in a not determinable installation platform. This erroneous installation is however recognized during the mounting, since by turning of the control device 1 the plug 200 is located on the opposite side and can no longer be connected with the plug provided on the installation platform.

In further not shown embodiments, any number of possible attachment places can be provided. It Is also recommended to provide more than one blocking attachment place, so that a plurality of possible combinations of open and blocking attachment places can be produced.

The blocking attachment places can be formed in different ways. In a housing produced by a pressure casting it is for example possible to produce open or blocking attachment places by punching out or retaining a casting skin. It is also possible to provide in the casting mold the attachment places with recesses or fully cast blocking attachment places.

In a further manufacturing variant, all possible attachment places 10-40 can be provided with openings 60. By introduction of a suitable device into one attachment place, this mounting place can be blocked. Suitable blocking devices, for example plugs, clamps or similar devices, can be used. Thereby the characterization of the different embodiment forms of the housing can be performed in a later manufacturing step.

The manufacturing variants have a joint feature in that a uniform housing platform can be utilized, and the different embodiment forms can be determined and characterized by small modifications during casting or later.

The utilization of a common housing platform has the advantage that the constructions of the printed boards, plugs, etc. can be maintained unchanged, so that for example in an airbag control device only the crush data set is to be changed.

It will be understood that each of the elements described above, or two or more together, may also find a useful application in other types of constructions differing from the types described above.

While the invention has been illustrated and described as embodied in control device with blockable attachment places, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control device, comprising,
a plurality of possible places for attachment for receiving mounting means on an installation point of a vehicle, wherein said control device is configured for installation in a predetermined vehicle type, the vehicle type being predetermined by the arrangement of the mounting means, each of said places for attachment comprising a recess for receiving a mounting means and at least one of said places for attachment being formed as at least one means for blocking said mounting means, thus making said place different than others of said places, which prevents receiving of said mounting means at an installation point of the vehicle type that is not provided for the control device,
and further comprising a device which is introduced in said recess of said place at least one of said recesses of at least one of said places for attachment that is formed as a device which blocks said mounting means and prevents the receiving of the mounting means in said at least one recess and thereby prevent an installation of the control device on a not predetermined installation platform.

2. A control device as defined in claim 1, wherein said device which prevents the receiving of the mounting means is a clamp.

3. A control device as defined in claim 1, wherein the control device is formed to correspond to a position of the at least one means for blocking mounting means.

4. A control device, comprising:
a plurality of possible places for attachment for receiving mounting means, at least one of said places for attachment being formed as a means for blocking mounting means which prevents receiving of said mounting means, wherein all of said places for attachment comprise recesses, wherein at least one of said recesses is blocked by inserting a device that prevents receiving of the mounting means in said at least one recess, and thereby prevent an installation of the control device on a not predetermined installation platform, wherein the places for attachment are arranged in a rectangular grid 70×95 mm.

5. A control device, comprising,
a housing;
a plurality of separate places provided for attachment for receiving mounting means on an installation point of a vehicle and connected with said housing, each of said places for attachment comprising a recess for receiving mounting means,
wherein said control device is configured for installation in a predetermined vehicle type, the vehicle type being predetermined by the arrangement of the mounting means, at least one of said places for attachment connected with said housing being formed as at least one means for blocking said mounting means thus making said place different than others of said places, which prevents receiving of said mounting means at an installation point of the vehicle type that is not provided for the control device, wherein at least one of said recesses is blocked by inserting a device that prevents receiving of the mounting means in said at least one recess and thereby prevent an installation of the control device on a not predetermined installation platform.

6. A control device as defined in claim 5, wherein said housing is substantially rectangular and said separate places including said at least one place are connected to the rectangular housing in corners only of said rectangular housing.

* * * * *